(12) United States Patent
Okada et al.

(10) Patent No.: US 7,975,516 B2
(45) Date of Patent: Jul. 12, 2011

(54) ELECTRIC STEERING LOCK APPARATUS

(75) Inventors: Takahiro Okada, Kanagawa-ken (JP); Tetsuyuki Tsukano, Kanagawa-ken (JP); Ryuichi Yoshida, Kanagawa-ken (JP); Yoshio Watanuki, Kanagawa-ken (JP)

(73) Assignees: Alpha Corporation, Yokohama-shi, Kanagawa-ken (JP); Nissan Motor Co., Ltd., Yokohama-shi, Kanagawa-ken (JP)

( * ) Notice: Subject to any disclaimer, the term of this patent is extended or adjusted under 35 U.S.C. 154(b) by 0 days.

(21) Appl. No.: 11/130,181

(22) Filed: May 17, 2005

(65) Prior Publication Data

US 2005/0268677 A1    Dec. 8, 2005

(30) Foreign Application Priority Data

May 24, 2004  (JP) ................. P2004-153598

(51) Int. Cl.
*B60R 25/02* (2006.01)
(52) U.S. Cl. .......................................... 70/186
(58) Field of Classification Search ............ 70/181–187, 70/252
See application file for complete search history.

(56) References Cited

U.S. PATENT DOCUMENTS

| | | | | | |
|---|---|---|---|---|---|
| 1,806,253 | A | * | 5/1931 | Fairchild | 70/252 |
| 5,230,233 | A | * | 7/1993 | Shoji et al. | 70/252 |
| 5,271,252 | A | * | 12/1993 | Yasuhara et al. | 70/186 |
| 5,315,851 | A | * | 5/1994 | Kuroki | 70/252 |
| 5,495,732 | A | * | 3/1996 | Nagae et al. | 70/252 |
| 6,076,382 | A | * | 6/2000 | Naganuma | 70/186 |
| 6,125,671 | A | * | 10/2000 | Suzuki | 70/186 |
| 6,233,986 | B1 | * | 5/2001 | Suzuki et al. | 70/252 |
| 6,295,848 | B1 | * | 10/2001 | Suzuki | 70/186 |
| 6,571,587 | B2 | * | 6/2003 | Dimig et al. | 70/186 |
| 7,024,895 | B2 | * | 4/2006 | Watanuki et al. | 70/186 |
| 2002/0069683 | A1 | * | 6/2002 | Bartels et al. | 70/186 |
| 2002/0088257 | A1 | | 7/2002 | Demig et al. | |
| 2005/0183476 | A1 | * | 8/2005 | Feucht et al. | 70/186 |

FOREIGN PATENT DOCUMENTS

| | | |
|---|---|---|
| DE | 10061960 | 7/2002 |
| DE | 10118545 | 10/2002 |
| EP | 240724 A1 * | 10/1987 |
| EP | 1182103 | 2/2002 |
| EP | 1 486 368 | 12/2004 |
| JP | 2002-205622 | 7/2002 |
| JP | 2002205622 | 7/2002 |
| JP | 2002-371735 | 12/2002 |
| JP | 2003-341479 | 12/2003 |
| JP | 2005-001606 | 1/2005 |

* cited by examiner

*Primary Examiner* — Suzanne D Barrett
*Assistant Examiner* — Christopher Boswell
(74) *Attorney, Agent, or Firm* — The Nath Law Group; Jerald L. Meyer; Stanley N. Protigal

(57) ABSTRACT

An electric steering lock apparatus includes a cam plate rotated in an unlocking direction and a locking direction by driving a motor unit, and a lock shaft shifting between a lock position at which the rotation of the steering shaft is prevented and an unlock position at which the rotation of the steering shaft is permitted, following to the sliding surface of the cam plate, wherein, at the position of the cam plate at which the lock shaft is located at the unlock position, the center of rotation of the cam plate is set at an eccentric position with respect to the position of the center of gravity of the cam plate so that the rotation torque resulting from the own weight of the cam plate acts in the unlocking direction.

8 Claims, 7 Drawing Sheets

ELECTRIC STEERING LOCK APPARATUS

BACKGROUND OF THE INVENTION

1. Field of the Invention

The present invention relates to an electric steering lock apparatus for locking a steering shaft of a vehicle.

2. Description of the Related Art

As this type of conventional electric steering lock apparatuses, there have been proposed various apparatuses as shown in, for example, Japanese Patent Application Laid-Open No. 2002-205622. When an electric steering lock apparatus is arranged using a cam member, the apparatus is mainly composed of a rotation shaft driven by a drive source, the cam member, which is fixed to the rotation shaft and rotates in an unlocking direction and in a locking direction together with the rotation shaft, a lock member, which has a cam abutment surface abutting against the sliding surface of the cam member and shifts between a lock position at which the rotation of a steering shaft is locked and an unlock position at which the rotation of the steering shaft is permitted following to the sliding surface of the cam member, and a spring for urging the lock member to the lock position.

In the above arrangement, when a vehicle parks, the lock member is located at the lock position to thereby lock the steering shaft. With this arrangement, the vehicle can be protected against theft when it parks.

When the parked vehicle is to be driven, the cam member is rotated in the unlocking direction by the drive source, thereby the lock member is shifted to the unlock position so that the steering shaft is free to rotate.

Incidentally, in the electric steering lock apparatus, although the lock member must be held at the unlock position at all times unless the vehicle parks, the following disadvantages arise when the relation between the rotating position of the cam member and the position of the center of gravity thereof and the relation between the contact position at which the cam member comes into contact with the lock member, and the center of rotation of the cam member are not taken into consideration.

That is, when the position of the center of gravity of the cam member is eccentric with respect to the center of rotation thereof and the rotation torque resulting from the own weight of the cam member acts in the locking direction at the position of the cam member at which the lock member is located at the unlock position, there is a possibility that the cam member is rotated in the locking direction by the rotation torque resulting from the own weight of the cam member and that the lock member is shifted to the lock position. Further, when the contact position at which the lock member comes into contact with the cam member is eccentric with respect to the center of rotation of the cam member and thus the rotation torque resulting from the external force from the lock member acts in the locking direction at the position of the cam member at which the lock member is located at the unlock position, there is a possibility that the cam member is rotated in the locking direction by the rotation torque resulting from the external force and the lock member is shifted to the lock portion.

SUMMARY OF THE INVENTION

The present invention has been achieved with such points in mind.

It therefore is an object of the present invention to provide an electric steering lock apparatus in which a cam member is not rotated in a locking direction by rotation torque acting thereon when a lock member is located at an unlock position and the unlock position of the lock member can be securely maintained.

In order to achieve the object, according to a first aspect of the present invention, there is provided an electric steering lock apparatus comprising a cam member rotated in an unlocking direction and a locking direction by a drive source; and a lock member having a cam abutment surface abutted against the sliding surface of the cam member, wherein the lock member shifts between a lock position at which the rotation of the steering shaft is prevented and an unlock position at which the rotation of the steering shaft is permitted, by following to the sliding surface of the cam member, wherein, at the position of the cam member at which the lock member is located at the unlock position, the center of rotation of the cam member is set at an eccentric position with respect to the position of the center of gravity of the cam member so that the rotation torque resulting from the own weight of the cam member acts in the unlocking direction.

In the structure according to the first aspect of the present invention, the rotation torque resulting from the own weight of a cam member acts in the unlocking direction at the position of the cam member at which the lock member is located at the unlock position. Accordingly, the cam member is not rotated in the locking direction by the rotation torque resulting from the own weight thereof, thereby the unlock position of the lock member can be securely maintained.

According to a second aspect of the present invention, there is provided an electric steering lock apparatus according to the first aspect, wherein, at the position of the cam member at which the lock member is located at the unlock position, the contact position at which the sliding surface of the cam member comes into contact with the cam abutment surface of the lock member, is set so that the rotation torque resulting from the external force acting on the cam member from the lock member acts in the unlocking direction.

In the structure according to the second aspect of the present invention, the rotation torque resulting from the external force from the lock member acts in the unlocking direction at the position of the cam member at which the lock member is located at the unlock position, in addition to the advantage of the first aspect of the present invention. Accordingly, the cam member is not rotated in the locking direction by the rotation torque resulting from the external force of the lock member, thereby the unlock position of the lock member can be securely maintained.

According to a third aspect of the present invention, there is provided an electric steering lock apparatus according to the first or the second aspect, further comprising a steering lock prevention means for preventing the shift of the lock member located at the unlock position.

In the structure according to the third aspect of the present invention, since the shift of the lock member to the lock position can be also prevented by a steering lock prevention means, the unlock position of the lock member can be more securely maintained, in addition to the advantages of the first and second aspects of the present invention.

BRIEF DESCRIPTION OF THE ACCOMPANING DRAWINGS

DETAILED DESCRIPTION OF THE PREFERRED EMBODIMENTS

Figure 1:
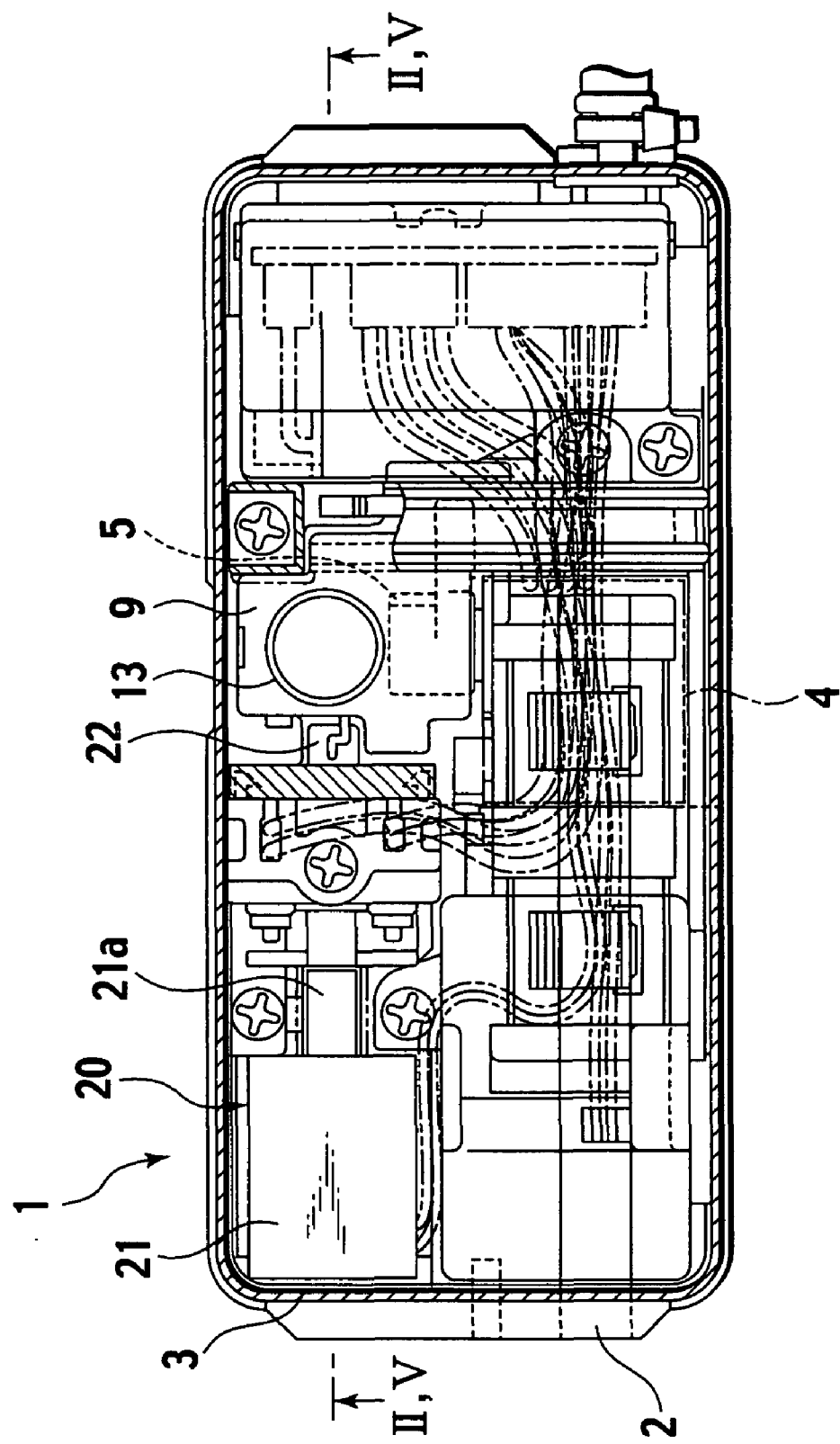
FIG. 1 is a plan view showing an electric steering lock apparatus of an embodiment of the present invention.

There will be detailed below the preferred embodiments of the present invention with reference to the accompanying drawings. Like members are designated by like reference characters.

Figure 2:
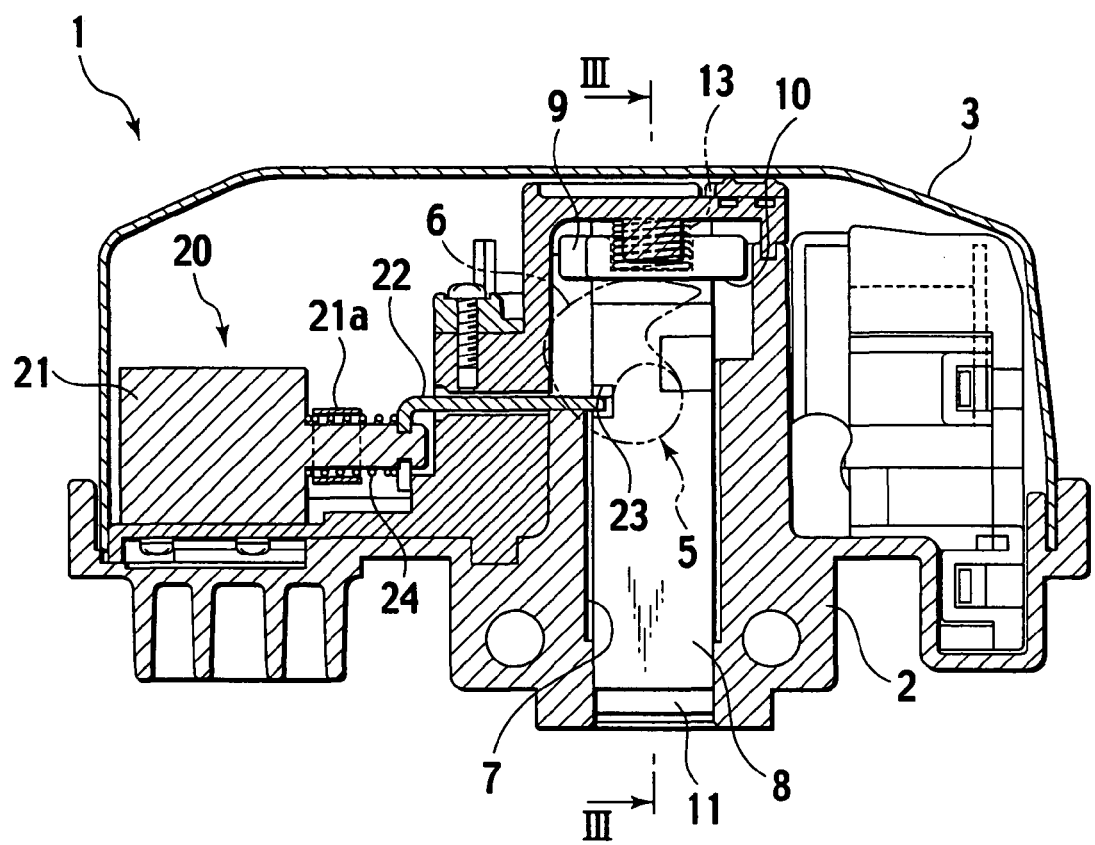
FIG. 2 is a sectional view taken along the line II-II of the electric steering lock apparatus of the embodiment of the present invention shown in FIG. 1 when a lock shaft is located at an unlock position.
Figure 3:
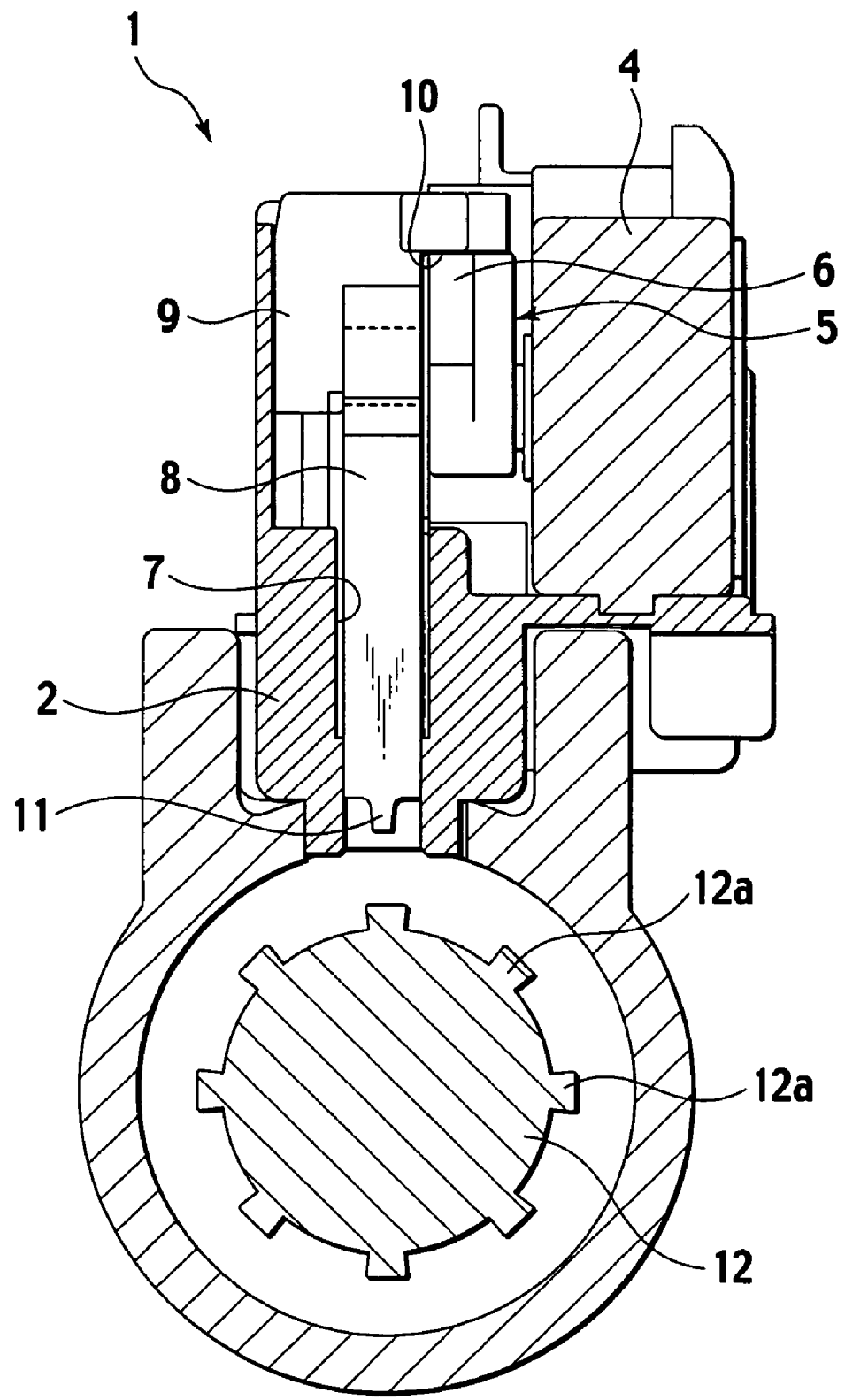
FIG. 3 is a sectional view taken along the line III-III of the electric steering lock apparatus of the embodiment of the present invention shown in FIG. 2.
Figure 4:
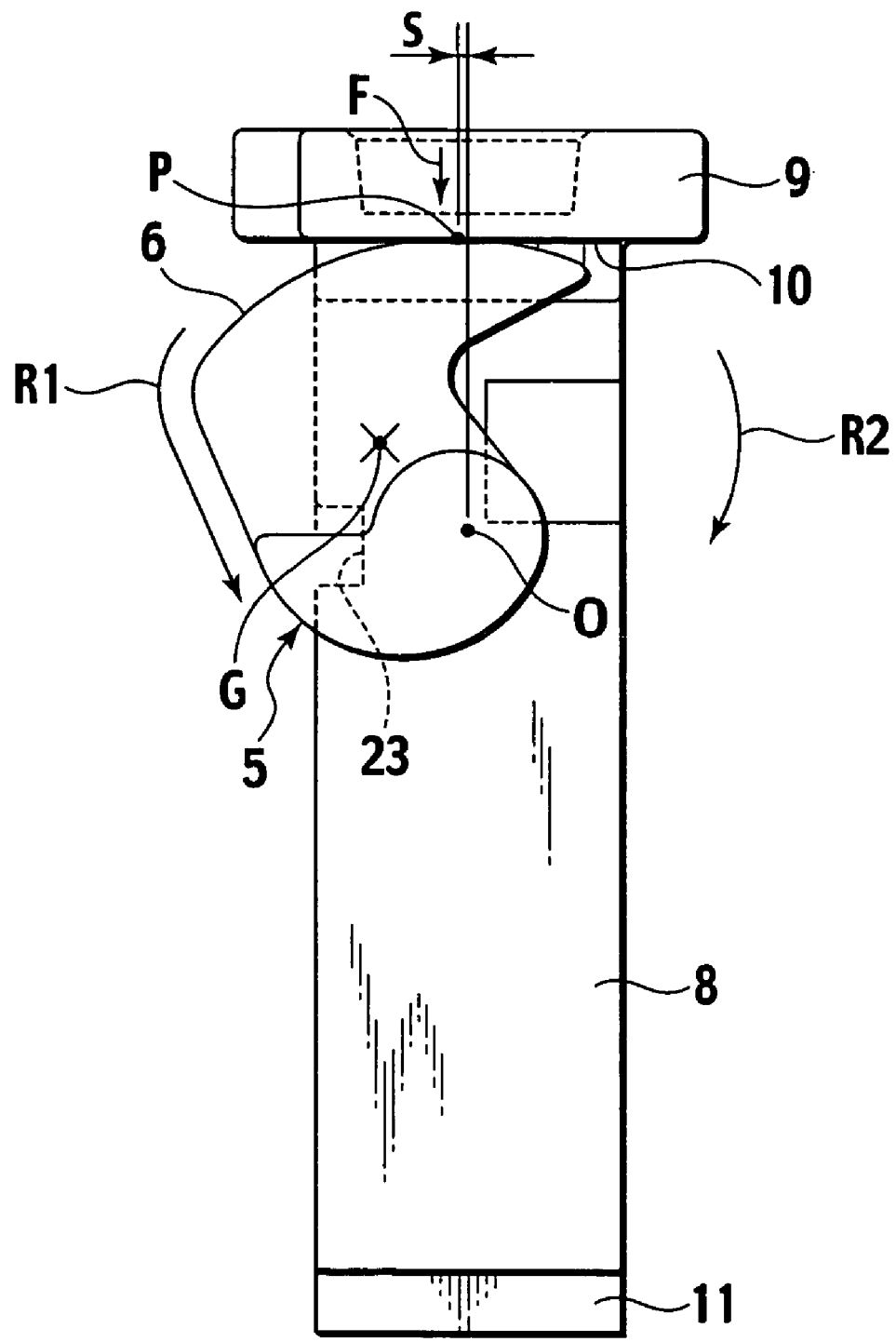
FIG. 4 is a schematic enlarged view showing the state in which the lock shaft and a cam plate are disposed at the unlock position in the embodiment of the present invention.
Figure 5:
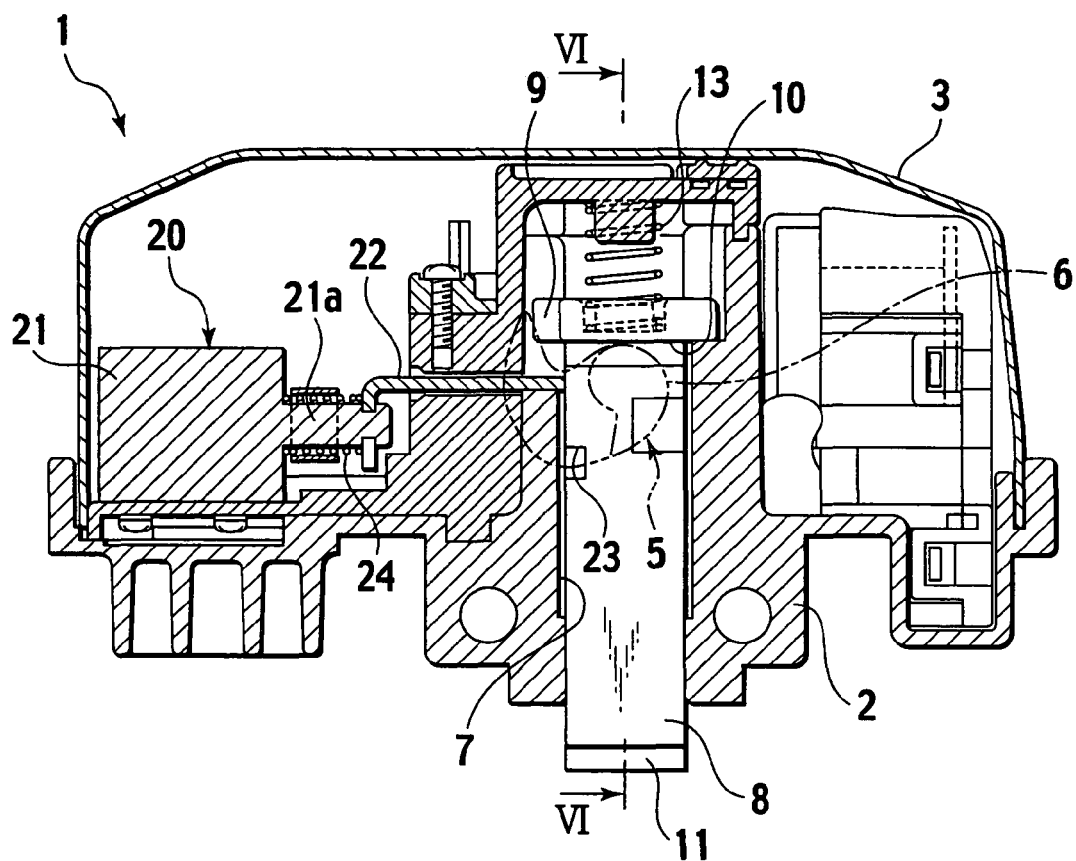
FIG. 5 is a sectional view taken along the line V-V of the electric steering lock apparatus of the embodiment of the present invention shown in FIG. 1 when the lock shaft is located at a lock position.
Figure 6:
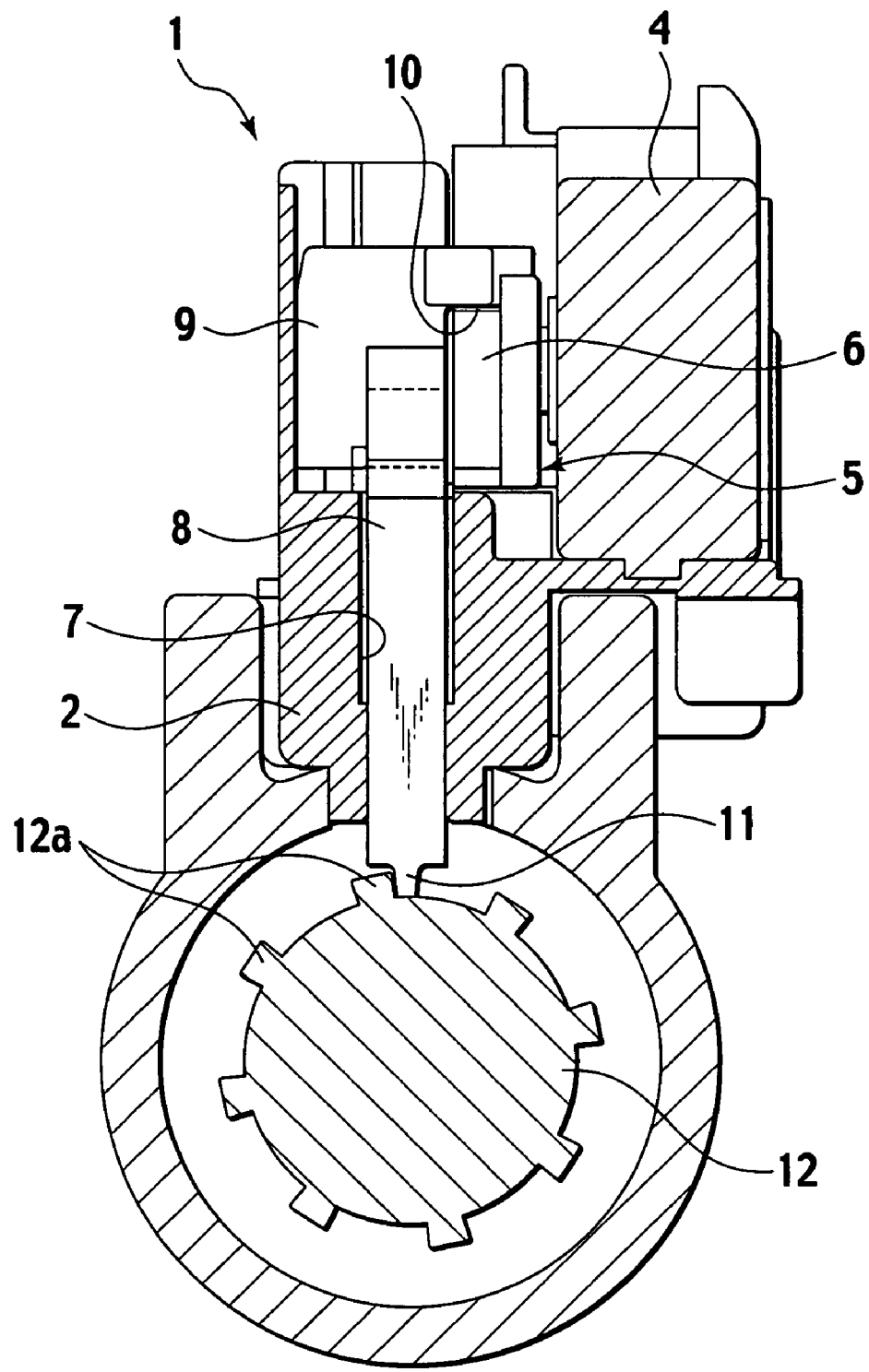
FIG. 6 is a sectional view taken along the line VI-VI of the electric steering lock apparatus of the embodiment of the present invention shown in FIG. 5.
Figure 7:
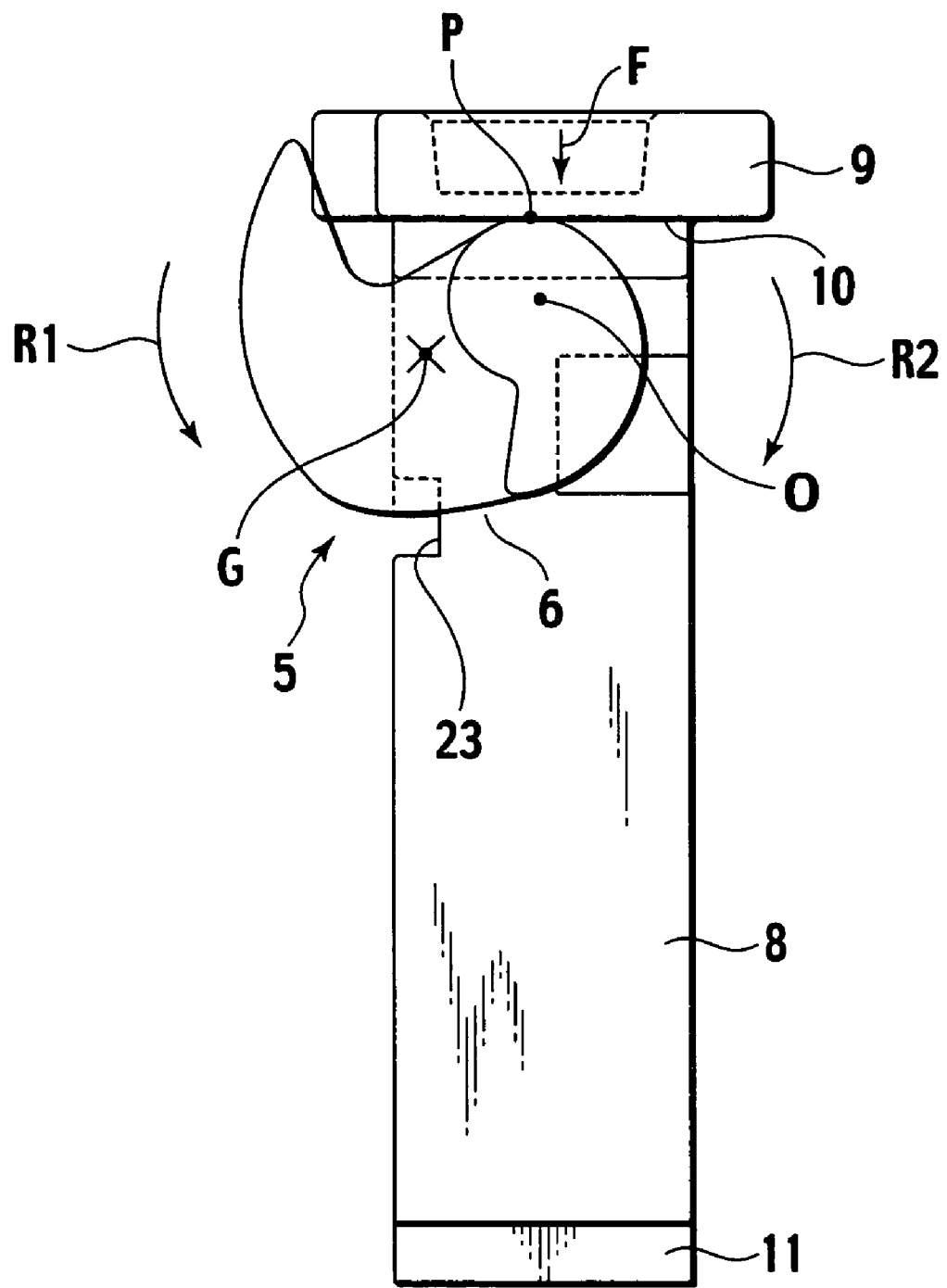
FIG. 7 is a schematic enlarged view showing the state in which the lock shaft and the cam plate are disposed at the lock position in the embodiment of the present invention.

FIGS. 1 to 7 show an electric steering lock apparatus of the present invention, wherein FIG. 1 is a plan view of the electric steering lock apparatus 1, FIG. 2 is a sectional view taken along the line II-II of the electric steering lock apparatus 1 shown in FIG. 1 when a lock shaft 8 is located at an unlock position, FIG. 3 is a sectional view taken along the line III-III of the electric steering lock apparatus 1 shown in FIG. 2, FIG. 4 is a schematic enlarged view showing the state in which the lock shaft 8 and a cam plate 5 are disposed at the unlock position, FIG. 5 is a sectional view taken along the line V-V of the electric steering lock apparatus 1 shown in FIG. 1 when the lock shaft 8 is located at a lock position, FIG. 6 a sectional view taken along the line VI-VI of the electric steering lock apparatus 1 shown in FIG. 5, and FIG. 7 is a schematic enlarged view showing the state in which the lock shaft 8 and the cam plate 5 are disposed at the lock position.

As shown in FIGS. 1, 2, and 5, the electric steering lock apparatus 1 has a frame 2, and a cover 3 for covering the upper portion of the frame 2, and a motor unit 4 as a drive source is fixed on the frame 2 covered with the cover 3. The motor unit 4 has a speed reduction mechanism disposed therein, and a cam plate 5 as a cam member is fixed to a rotation shaft (not shown) projecting from a unit case. Note that FIG. 2 shows an arrangement (state) of the electric steering lock apparatus 1 when a steering shaft is unlocked, and FIG. 5 shows the arrangement (state) thereof when the steering shaft is locked.

The cam plate 5 is rotated in an unlocking direction R1 and in a locking direction R2 opposite to the unlocking direction R1 by the rotation of the rotation shaft. The cam plate 5 has a sliding surface 6 formed on the outer peripheral surface thereof. The sliding surface 6 is formed such that the distance from the sliding surface 6 to the center of rotation O of the cam plate 5 gradually changes as the rotation angle thereof changes. Then, the slide surface 6 is formed such that the distance from the sliding surface 6 to the center of rotation O of the cam plate 5 is minimized at a contact position P at which the lock shaft 8, which will be described below, is located at the lock position (refer to FIG. 7) and the distance from the sliding surface 6 to the center of rotation O of the cam plate 5 is maximized at a contact position P at which the lock shaft 8 is located at the unlock position (refer to FIG. 4)

The frame 2 has a slide hole 7 passing therethrough in a vertical direction, and the lock shaft 8 as a lock member is movably disposed in the slide hole 7. A hanger unit 9 is fixed to the upper end of the lock shaft 8. A cam abutment surface 10 is formed on the lower surface of the hanger unit 9 and abutted against the sliding surface 6 of the cam plate 5. Spring force acts on the upper surface of the hanger unit 9 to urge the lock shaft 8 to the lock position as well as to cause the cam abutment surface 10 to be abutted against the cam plate 5.

The lock shaft 8 has a lock pin 11 disposed to the lower end thereof. The lock shaft 8 moves following to the sliding surface 6 of the cam plate 5 and shifts between the lock position shown in FIGS. 5 to 7 and the unlock position shown in FIGS. 2 to 4. At the lock position, the lock pin 11 enters between the projections 12a of a steering shaft 12 (state shown in FIG. 6) to thereby prevent the rotation of the steering shaft 12. At the unlock position, the lock pin 11 is located outside of the rotation locus of the projections 12a of the steering shaft 12 (state shown in FIG. 3) to thereby permit the steering shaft 12 to rotate.

Next, there will be explained the relation between the center of rotation O of the cam plate 5 and the position of the center of gravity G thereof and the relation between the contact position P, at which the cam plate 5 is in contact with the lock shaft 8, and the center of rotation O of the cam plate 5 at the position of the cam plate 5 at which the lock shaft 8 is located at the unlock position. As shown in FIG. 4, at the position of the cam plate 5 at which the lock shaft 8 is located at the unlock position, the center of rotation O of the cam plate 5 is set at an eccentric position with respect to the center of gravity G of the cam plate 5 so that the rotation torque resulting from the own weight of the cam plate 5 acts in the unlocking direction R1. Further, at the position of the cam plate 5 at which the lock shaft 8 is located at the unlock position, the contact position P, at which the sliding surface 6 of the cam plate 5 comes into contact with the cam abutment surface 10 of the lock shaft 8, is set so that the rotation torque resulting from external force F, which acts on the cam plate 5 from the lock shaft 8, act in the unlocking direction R1. That is, as shown in FIG. 4, the contact position P is eccentric with respect to the center of rotation O by an amount of eccentricity S.

As shown in FIGS. 1, 2, and 5, the electric steering lock apparatus 1 includes a steering lock prevention means 20. The steering lock prevention means 20 has an electromagnetic solenoid 21 fixed on the frame 2 covered with the cover 3, and an extreme end of a lock plate 22 is fixed to an expansion rod 21a of the electromagnetic solenoid 21. The other extreme end of the lock plate 22 extends to a position near to the lock shaft 8. When the lock shaft 8 is located at the unlock position and the electromagnetic solenoid 21 is turned off, a spring 24 causes the lock plate 22 to enter the locking groove 23 of the lock shaft 8 to thereby prevent the shift of the lock shaft 8. When the electromagnetic solenoid 21 is turned on, the lock plate 22 is removed from the locking groove 23 of the lock shaft 8 to thereby permit the shift of the lock shaft 8.

In the above arrangement, when the vehicle parks, the lock shaft 8 is located at the lock position shown in FIGS. 5 to 7, thereby the rotation of the steering shaft 12 is locked. With this operation, the theft of the vehicle can be prevented.

Next, when a driver depresses a steering lock switch (not shown) to start an engine, the motor unit 4 is driven so that the cam plate 5 is rotated in the unlocking direction R1. With this operation, the lock shaft 8 shifts to the unlock position shown in FIGS. 2 to 4 to thereby permit the steering shaft 12 to rotate.

When the lock shaft 8 shifts to the unlock position, the lock plate 22, which is coupled with the electromagnetic solenoid 21 of the steering lock prevention means 20, is locked to the locking groove 23 of the lock shaft 8 by the urging force of the spring 24. When the engine is started and the vehicle travels, the lock shaft 8 is held at the unlock position, thereby the steering shaft 12 is permitted to rotate freely.

When the engine is stopped and set to an ACC position, the electromagnetic solenoid 21 of the steering lock prevention means 20 is turned on, and the lock plate 22 is removed from the locking groove 23 of the lock shaft 8. With this operation, the steering shaft can be locked.

Next, when the driver depresses the steering lock switch (not shown) again, the motor unit 4 is driven so that the cam plate 5 is rotated in the locking direction R2. With this operation, the lock shaft 8 shifts to the lock position shown in FIGS. 5 to 7, thereby the rotation of the steering shaft 12 is prevented.

During the above operation, at the position of the cam plate 5 at which the lock shaft 8 is located at the unlock position, the rotation torque resulting from the own weight of the cam plate 5 acts in the unlocking direction R1 as explained in detail in FIG. 4. Accordingly, the cam plate 5 is not rotated in the locking direction R2 by the rotation torque resulting from the own weight thereof, thereby the lock shaft 8 is securely held at the unlock position.

In the embodiment, at the position of the cam plate 5 at which the lock shaft 8 is located at the unlock position, the rotation torque resulting from the external force F (vibration, shock, and the like) from the lock shaft 8 also acts in the unlocking direction R1 as explained in detail in FIG. 4. Accordingly, the cam plate 5 is not rotated in the locking direction R2 by the rotation torque resulting from the external force F, thereby the lock shaft 8 can be securely held at the unlock position.

In the embodiment, when the lock shaft 8 is located at the unlock position, the shift of the lock shaft 8 to the lock position is also prevented by the steering lock prevention means 20.

That is, in the embodiment, the cam plate 5 arranged as described above and the steering lock prevention means 20 establish a failsafe mechanism for preventing the danger that the steering shaft 12 is locked when the vehicle travels, and the like. In particular, the cam plate 5 prevents such a circumstance that the lock shaft 8 locks the steering shaft 12 when the steering lock prevention means 20 does not normally operates for any reason, and the like. For example, when the cam plate 5 unexpectedly begins to rotate due to the malfunction of the motor unit 4 and when the lock shaft 8 is unexpectedly dropped from the cam plate 5 by violent vibration during the travel of the vehicle, the steering lock prevention means 20 prevents such a circumstance that the lock shaft 8 urged by the spring 13 locks the steering shaft 12.

Although the steering lock prevention means 20 is provided in the embodiment, the steering shaft 12 can be prevented from being locked during the travel of the vehicle even if it is omitted. The electric steering lock apparatus 1 can be arranged compact, light weight and low cost by omitting the steering lock prevention means 20.

The entire contents of Japanese Patent Application P2004-153598 (filed on May 24, 2004) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. An electric steering lock apparatus comprising:
a cam member including a shaft portion and a cam portion, the cam portion formed so as to extend from the shaft portion, the cam portion formed as L-shaped, and having a center of rotation of the cam member being located in the shaft portion and having a center of gravity of the cam member being located in the cam portion, the cam portion of the cam member having a sliding surface formed on an outer peripheral surface thereof, the cam member rotated in an unlocking direction and a locking direction in a plane by a drive source;
a steering shaft lock member having a cam abutment surface abutted against the sliding surface of the cam portion of the cam member, the cam abutment surface being a flat surface, wherein the steering shaft lock member shifts, by following to the sliding surface of the cam member, between a first direction in the plane between a lock position at which the steering shaft lock member prevents rotation of a steering shaft and an unlock position at which the steering shaft lock member permits rotation of the steering shaft;
a steering lock prevention plate biased by urging force of a spring, wherein the biasing of the spring urges the steering lock prevention plate toward the steering shaft lock member, and movable out of engagement with the steering shaft lock member by activating an electromagnetic solenoid to permit the steering shaft lock member to lock; and
a locking groove in the steering shaft lock member, capable of receiving the steering lock prevention plate with the steering shaft lock member positioned in the unlock position, the steering lock prevention plate engages with the locking groove to prevent rotation of the cam member and thereby hold the locking member in the unlocked position during driving operation of a vehicle associated with the electric steering wheel lock apparatus, and disengagable with the locking groove to permit rotation of the cam member and thereby permit locking of the apparatus,
wherein, at the rotating position of the cam member when the steering shaft lock member is located at the unlock position, the position of the center of gravity of the cam member is set at an eccentric position with respect to the center of rotation of the cam member in a second direction perpendicular to the first direction in the plane and the cam driven by the drive source in a manner so that the rotation torque resulting from the own weight of the cam member acts so as to rotate the cam member in the unlocking direction thereby urging the steering shaft lock member to remain at the unlock position,
and wherein, at the rotating position of the cam member when the steering shaft lock member is located at the unlock position, a contact position at which the sliding surface of the cam portion of the cam member comes into contact with the cam abutment surface of the steering shaft lock member is shifted from the center of rotation of the cam member with an amount of eccentricity in the second direction in the plane in a manner such that the contact position is located between the center of rotation of the cam member and the center of gravity of the cam member in the second direction in the plane, so that applied external force biases the cam member and the steering shaft lock member so as to rotate the cam member in the unlocking direction, thereby also keeping the steering shaft lock member staying at the unlock position.

2. An electric steering lock apparatus according to claim 1, wherein, at the position of the cam member at which the steering shaft lock member is located at the unlock position, the contact position at which the sliding surface of the cam member comes into contact with the cam abutment surface of the steering shaft lock member, is set so that the rotation torque generated by the external force acting on the cam member from the steering shaft lock member acts in the unlocking direction.

3. An electric steering lock apparatus according to claim 2, further comprising:
an electromagnetic solenoid driving the steering lock prevention plate, the solenoid configured so that, when not energized the solenoid permits the biasing of the spring to move the steering lock prevention plate toward the steering shaft lock member so that the solenoid and steering lock prevention plate provide a steering lock prevention unit preventing the shift of the steering shaft lock member from the unlock position.

4. An electric steering lock apparatus according to claim 1, further comprising:
an electromagnetic solenoid driving the steering lock prevention plate, the solenoid configured so that, when not energized the solenoid permits the biasing of the spring to move the steering lock prevention plate toward the steering shaft lock member so that the solenoid and steering lock prevention plate provide a steering lock prevention unit preventing the shift of the steering shaft lock member from the unlock position.

5. An electric steering lock apparatus according to claim 1, wherein the sliding surface is formed such that the distance from the sliding surface to the center of rotation of the cam member gradually changes in accordance with a change in the rotation angle thereof.

6. An electric steering lock apparatus according to claim 1, wherein the sliding surface is formed such that the distance from the sliding surface to the center of rotation of the cam member is minimized at a contact point in the locking position.

7. An electric steering lock apparatus according to claim 1, wherein the sliding surface is formed such that that the distance from the sliding surface to the center of rotation of the cam member is maximized at a contact point in the unlocking position.

8. An electric steering lock according to claim 1, wherein the locking groove in the steering shaft lock member extends partially through the steering shaft lock member, thereby accepting the steering lock prevention plate to extend as a plate member into the steering shaft lock member without extending through the steering shaft lock member.

* * * * *